Patented June 20, 1950

2,512,063

UNITED STATES PATENT OFFICE 2,512,063

SYNTHETIC RESINS BASED ON INORGANIC CONSTITUENTS

Ignaz Kreidl and Werner Kreidl, New York, N. Y., assignors to Ferro Enamel Corporation, Cleveland, Ohio, a corporation of Ohio No Drawing. Application November 26, 1945, Serial No. 630,980

1 Claim. (Cl. 260—2)

This invention relates to resins and more particularly to polymers which are the condensation products of: (a) polyvalent, and preferably at least trivalent, amphoteric cations, e. g. zirconium, aluminum, titanium, iron, etc., in the form of alcoholates, phenolates or chlorides with (b) neutral or non-acidic esters of phosphoric or silicic acids.

It is known that prior art workers, as for example the patentees in U. S. Patents Nos. 2,150,349 and 2,329,707, have prepared: (a) amphoteric polyvalent metal salts of acid esters of phosphorus and (b) organic complex compounds which are the reaction products of metal compounds, such as the oxides and hydroxides, of organic compounds containing a readily replaceable hydrogen atom with organic compounds of acid forming multivalent elements of groups 5 and 6 of the periodic table.

None of these compounds as thus produced have been true polymers or condensation products. Certain of these products are metal salts of acid esters which are neither polymerized nor capable of being polymerized by any known method. Others are metal salts of organic compounds which are joined by co-valences to organic phosphites or phosphines but in which all of the primary valences of both cation and anion are saturated with organic radicles. Such compounds therefore are complexes but do not have polymeric resinous structures. All these compounds, therefore, have a crystalline or a gel-like structure in contradistinction to the resin type structure of the compounds which are the subject of the present invention.

Broadly stated, the invention is concerned with the preparation of resin-like material by condensation of an organic derivative of an inorganic cation with an organic derivative of an inorganic anion by which condensation (at least in the first steps of the reaction) only a certain proportion of the organic radicals, bound to the cation and anion respectively, is gradually split off, resulting in the formation of primary bonds between said cations and anions.

Illustrative of such reaction is the following:

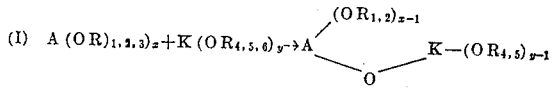

wherein $R_1$, $R_2$, $R_3$, $R_4$, $R_5$, $R_6$, are the same or different organic radicals; A is a polyvalent inorganic metalloid or monoxide of an at least pentavalent metalloid; K is a polyvalent inorganic metal, or a monoxide of a metal having a valence of at least 5, and O is oxygen, $x$ is the valence of the metalloid, and $y$ is the valence of the metal. This reaction is continued by further replacement of R's by reaction with additional molecules of the same compound.

The intermediate of the above illustration may be prepared by starting with one strictly inorganic component. The reaction then proceeds as follows:

(II)

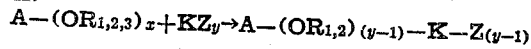

and which reaction is continued by further elimination of Z's by reaction with additional molecules of said compound and further continued by replacement of R's in the manner described above. In this Formula II the symbols have the same meaning as in Formula I above and Z denotes an inorganic radical such as chlorine.

While at least two "OR" groups are required in both the anionic and cationic compound, the additional aryl or alkyl groups are attached to the metalloid directly.

The above reactions will occur and proceed as indicated if both the organic anionic and organic cationic compounds are of sufficiently low reactivity with regard to each other.

In most cases, these conditions and the above type of reactions will be obtained by choosing such compounds as starting materials, which (or at least the first formed intermediate of which) will not substantially react at temperatures below 120° C., but at temperatures higher than 120° C. the reaction will proceed.

However, independent of the above theory broadly stated, the present invention is concerned with the preparation of resin-like materials by the condensation of organic and inorganic compounds of such stability that they will not substantially react at temperatures below 120° C., but at temperatures higher than 120° C. will react or combine by the replacement of an organic substituent grouping from the anionic compound by the inorganic cationic component of the reaction, whereby not only a polymeric structure is formed, but it is also made possible to prepare compounds which are soluble in benzol and which have an exceedingly high inorganic content.

From the foregoing broad statement of the invention it will be observed that the inorganic element of which the alcoholate, phenolate or chloride is employed in the condensation reaction must be both polyvalent and amphoteric. It must be polyvalent in order that there may be a sufficient number of valences which upon partial satisfaction will produce polymeric structure. The element must be amphoteric, i. e. its dissociation constant must be small enough so that the reaction will proceed as a condensation reaction at the slow velocity necessary for the production of a polymeric end product.

Similarly, the nucleus of the anionic material must be polyvalent in order that there may be produced a polymeric structure upon combination thereby with the polyvalent cationic nucleus. It is for this reason that phosphorus and silicon are preferred as the nuclear atom for the anionic component of the condensation reaction.

With the foregoing introduction it now becomes convenient to list a number of the cationic materials which may be used and to indicate the methods by which they may be prepared, certain methods of which are believed to be new per se and are claimed as such herein.

List of cationic materials

Zirconium n-butylate
Zirconium dichlor iso propionate
Zirconium octylates
Zirconium phenolates
Zirconium 2-4-6 trichlor phenolate
Zirconium naphtholate
Zirconium mono chlor butylate
Aluminum n-butylate
Titanium n-butylate
Ferric iron dichlor propionate
Pentavalent antimony dichlor propionate Chlorides such as zirconium chloride are also useful if their initial reaction leads to intermediates by which gradually all of the chlorine is substituted, partly by linkage with the polyvalent anion, partly with the organic radical split off from the said anion by the formation of said linkage as explained in connection with the formulas previously given.

This is especially true in the case of reactions employing aromatic esters such as the reaction of ZrCl₄ with tricresyl phosphate. That the reaction proceeds according to this illustration can be shown by analyzing the intermediates formed. Gradually all chlorine is replaced from the zirconium chloride, as shown by titration with AgNO₃ while hydrolyzing. No cresol is set free in this stage. As all the valences of both zirconium and phosphorus must be satisfied either by cresyl or oxygen bridges between zirconium and phosphorus, as much cresyl must be bound to zirconium as to phosphorus when all of the chlorine has been replaced.

Methods of preparation of the cationic material

The cationic materials which may be used in carrying out the condensation reactions which are productive of the polymeric materials of our invention may be prepared in a variety of ways, of which the following are representative:

1. Chlorides of polyvalent amphoteric cations may be reacted with alcohols or phenols in the presence of metallic sodium. Filtration of NaCl.

2. Refluxing chlorides of polyvalent amphoteric cations with alcohols or phenols in organic solvent for several days. Precipitation of residual chlorine with NH₃ gaseous or amines.

3. Zirconium chlor alcoholates produced by the reaction of organic oxides (excess of about 30–100%); preferably epichlor hydrin with metallic chlorides.

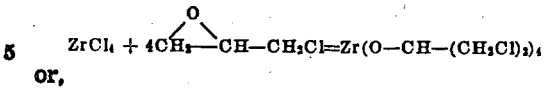

or,

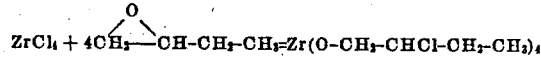

Reaction is carried out either in solvent or with ice cooling or both by slowly adding the components. As the solvent, either an inert solvent such as benzol or toluene, or an alcohol as butyl alcohol, or a mixture of both kinds may be used. The solvents may be removed by distillation under 120–130° C.

4. A material which may be referred to as zirconium trichlorphenolate may be prepared by refluxing trichlor phenol in benzol or toluene with ZrCl₄ until most of the zirconium is converted to an insoluble product. An alcohol such as butyl alcohol is added and is refluxed until complete solution is obtained. The product can be concentrated by distillation.

The various anionic materials which may be employed in the condensation reaction aforesaid include the following:

Compounds of phosphorus—
  Phosphoric esters:
    Tri-methyl phosphate (best with aromatic cationic compound)
    Tri-ethyl phosphate
    Tri-hexyl phosphate
    Tri-octyl phosphate
    Tri-phenyl phosphate
    Tri-cresyl phosphate (best with chloride)
  Phosphinic esters
  Phosphonic esters:
    Di-octyl phosphonate
    Di-octyl phenyl phosphonate
    Di-phenyl phenyl phosphonate
    Di-octyl styryl phosphonate
Compounds of silicon—
  Aryl and alkyl silicates, e. g. tetra ethyl silicate The ratio of cationic to anionic compounds should be such as to use them in equi-valent amounts or an excess of the anionic material but not more than correspond to pyro compounds.

It should be observed that for best results, the organic substituent groups of the anionic material should contain a minimum of at least six carbon atoms. The more carbon atoms contained in such substituents, the slower the reaction and the more the reaction leads to polymers. Aromatic compounds react more slowly than aliphatic compounds of the same number of carbon atoms. In order to obtain the most reaction and at the same time the highest degree of polymerization, it is of advantage to react the most reactive anionic ester with the most stable cationic compounds, such as e. g. Zr trichlor phenolate with trimethyl phosphate, or, still better, the least reactive ester with the most reactive cationic compound, e. g. tricresyl phosphate with the metal chloride.

In general, the resins having greatest stability at higher temperatures will be produced when the organic substituent preferably in the anionic component is a ring structure and preferably a benzenoid ring structure. It is further of advantage to use as organic components chlorinated compounds.

The condensation preferably is carried out in several stages as outlined below:

1. Refluxing of the components (in an inert solvent if desired) below 120° C. if there is any reaction at this temperature at all.
2. Continued condensation while the organic reaction products are being distilled off at rising temperatures but interrupting said distillation either before the products become too insoluble or before they become too viscous to be applied as such. In any event, at least 40% of the valences of both anion and cation should be linked, i. e., the reaction should be carried on until at least 40% of the replaceable substituents have been liberated.
3. Baking the compounds in situ to insolubilize them.

Catalysts (may sometimes be used to advantage):

Acid compounds to be used where reaction is too slow and to be avoided where too fast. Suitable: dichlor propyl alcohol, phenol and chlorinated phenols.

Water to be used where reaction is too slow and to be avoided where too fast. Best use: In final baking, preferably by applying resin in water emulsion.

The following includes a number of examples showing the preparation of the polymers with which the present invention is concerned.

1. 23 grams $ZrCl_4$, 50 cc. tricresyl phosphate, 50 cc. toluene are refluxed under shaking. After some time, butyl alcohol may be added (35 cc.). The temperature is raised and the solvents are distilled over. Then heating is continued at such temperatures that only HCl, but no liquids, are distilling over until the product is completely free of ionizable chlorine. Then the temperature is steadily and rapidly increased to distill as much over while the product still remains liquid. The thus obtained resin is redissolved preferably while still hot before it is finally baked. The resin is solid at room temperature.

2. 23 grams $ZrCl_4$, 100 cc. tricresyl phosphate, 50 cc. toluene as above. The resin after distillation off of the solvents is either refluxed at 400° C. under shaking, or treated as above, but finally heated up to about 500° C., the distillates going over at a temperature at the top of the condenser up to about 370° C. The resin is liquid at room temperature.

3. 115 grams $ZrCl_4$, 100 cc. 2,4,6 trichlor phenol, 500 cc. toluene, reflux, until no HCl comes over; then add 125 cc. trimethyl phosphate, 100 cc. butyl alcohol, reflux 2 hours, distill solvents off. This resin can be used as such, diluted in an organic solvent or emulsified with water.

4. Preparation of dichlor propionates:

(a) Dissolve 157 grams $ZrCl_4$ in 186 butyl alcohol. Add slowly under ice cooling 500 cc. epichlor hydrine in 250 cc. toluene. The product may be refluxed and concentrated by distillation under 130° C.

(b) 6 cc. $SbCl_5$, 75 cc. benzene, add 27 cc. epichlor hydrine, 50 cc. butyl alcohol as above.

(c) 20 cc. $TiCl_4$, 100 cc. toluene, 45 cc. butyl alcohol, add 52 cc. epichlor hydrin in 52 cc. toluene as above.

5. Preparation of monochlor butylate—46 grams $ZrCl_4$ in 100 cc. toluene, add under cooling 80 cc. epoxy butylene in 48 cc. toluene as above.

6. Preparation of zircon nitrochlor propionate—5 grams zircon nitrate is stirred with 20 grams epichlor hydrine in 100 cc. benzene under ice cooling until all the zirconium nitrate has dissolved.

7. Zirconium dichlor propionate prepared from 233 grams $ZrCl_4$, 500 cc. toluene, 371 cc. butyl alcohol, 500 cc. epichlor hydrine. This was refluxed with 627 cc. trioctyl phosphate for three hours, the solvents distilled off and then subjected to fast distillation until the product became very viscous.

8. Zirconium dichlor propionate prepared from 12 grams $ZrCl_4$ in 18 cc. butyl alcohol and 21 cc. epichlor hydrine in 21 cc. toluene. This is refluxed with 20 grams dioctyl styryl phosphonate and distilled up to 160° C.

9. Zirconium dichlor propionate is prepared from 8 grams $ZrCl_4$. This is refluxed with 24 grams o-ethyl silicate and distilled up to 135° C.

Other modes of applying the principle of the invention may be employed, change being made as regards the details described, provided the features stated in the following claim or the equivalent of such be employed.

We therefore particularly point out and distinctly claim as our invention:

The method of producing a resinous polymeric material which comprises reacting zirconium n-butylate with tri-hexyl phosphate at a temperature above about 120° and continuing such reaction until at least 40% of the total number of organic radicals in both reactants have been replaced.

IGNAZ KREIDL.
WERNER KREIDL.

REFERENCES CITED

The following references are of record in the file of this patent:

UNITED STATES PATENTS

| Number | Name | Date |
|---|---|---|
| 1,938,642 | Runyan | Dec. 12, 1933 |
| 2,086,077 | Groll et al. | July 6, 1937 |
| 2,199,944 | Van Peski et al. | May 7, 1940 |
| 2,221,440 | Burnett | Nov. 12, 1940 |
| 2,231,595 | Safford et al. | Feb. 11, 1941 |
| 2,268,062 | Simons | Dec. 30, 1941 |
| 2,409,774 | Mack et al. | Oct. 22, 1946 |